Dec. 16, 1958  A. KLEINKNECHT  2,864,627

TRACTOR WITH SEMI-TRAILER LIFTING DEVICE

Filed March 28, 1955

INVENTOR

Alfred Kleinknecht

By Richard Lord

Ag't

United States Patent Office 2,864,627
Patented Dec. 16, 1958

2,864,627

TRACTOR WITH SEMI-TRAILER LIFTING DEVICE

Alfred Kleinknecht, Unterohrn-Oehringen, Germany

Application March 28, 1955, Serial No. 496,996

Claims priority, application Germany April 2, 1954

7 Claims. (Cl. 280—401)

This invention relates to a tractor and trailer, and more particularly to a tractor with a so-called semitrailer.

It is a common experience that tractors with an empty semitrailer are nose heavy so that lightly loaded driving wheels lack traction, especially when backing up on rough building sites, on muddy ground, etc., with the result that exact steering is difficult. Also, if on icy roadways a semitrailer is not fully loaded, sufficient pressure on the rear wheels is missing to prevent slipping. These difficulties limit the use of semitrailers under many conditions.

The primary object of my present invention is to overcome the disadvantages associated with the use of empty or inadequately loaded semitrailers.

More specifically, my invention aims at the provision of an adequate load to rest upon the driving wheels of the tractor, regardless of the load carried by the semitrailer.

In accordance with the present invention, the above and other objects which will appear hereinafter are achieved by providing a lifting device on the tractor. The lifting device is mounted on the tractor, in addition to the support for the trailer, and is arranged behind the support. The movable or elevating member of the lifting device acts upon the underside of the trailer. With the aid of my lifting device, it is possible to vary the load to be carried by the rear wheels of the tractor. Wherever in the specification and in the appended claims terms, such as "behind," "rear," "forward," are used, they are employed with respect to the driving direction of the vehicles.

The specification is accompanied by a drawing in which.

Figure 3:
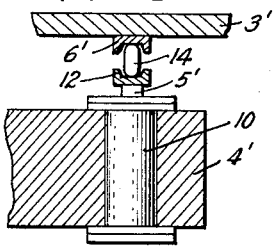
Fig. 3 shows schematically a fragmentary longitudinally sectioned elevation of a modified lifting mechanism.

Referring to the drawing in greater detail, the frame 1 of the tractor extends backwards beyond the support 2 for the trailer 3. This support is located, as usual, forwardly of the driving axle 7 of the tractor. At the rear end of the extension 4 of the frame 1, there is a lifting device 5 which is adapted to operate against bearing means 6 secured to the underside of the trailer. The extension 4 is approximately one sixth of the total length of the trailer. The movable or elevating member of the lifting device, on actuation of the device, bears either immediately upon the underside of the trailer or upon the bearing means shown. The bearing means may be given an arcuate shape, the arc being concentric with respect to the support 2.

Figure 1:
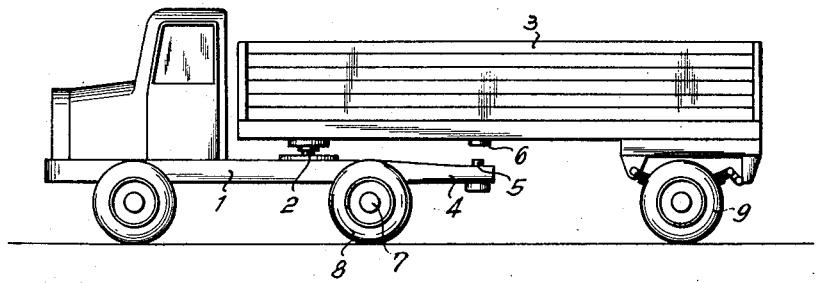
Fig. 1 is a side elevation of a tractor and semitrailer, the two units being connected together.
Figure 2:
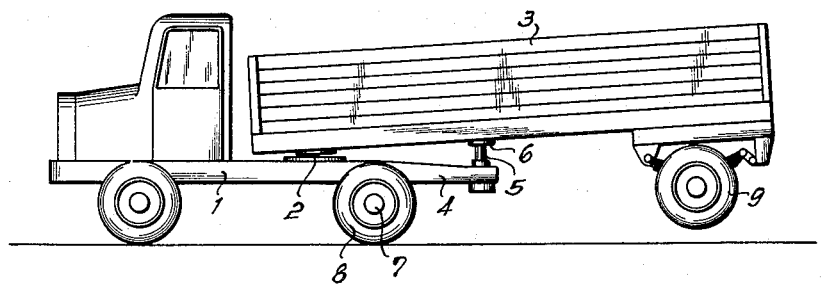
Fig. 2 shows the same tractor and trailer, with the trailer being lifted.

In normal operation, the lifting device 5 is retracted as shown in Fig. 1. With the trailer 3 empty or only lightly loaded, the pressure on the driving rear wheels 8 of the tractor is relatively light since the trailer exerts relatively little pressure on the tractor. With a slippery road surface or under similar unfavorable road conditions, the traction of the drive wheels 8 is, therefore, inadequate, so that safety of driving is impaired or totally lost. This may occur both during forward and backward driving. However, by actuation or extension of the lifting device, it is possible to increase the load on the rear axle of the tractor. This is not only achieved by applying the weight of the trailer to the wheels 8 by leverage, but also by transferring by means of the lifting device at least part of the load from the rear wheels 9 of the trailer to the driving wheels of the tractor. The extent of this load transfer may be controlled by varying the extension of the lifting device. This reduces at the same time the nose heaviness of the tractor derived from the load acting upon the front wheels. Such reduction is only limited by the need for an adequate pressure for steering. When reversing with a lightly loaded trailer, the lifting device is preferably extended until the wheels 9 are raised off the ground.

Figure 4:
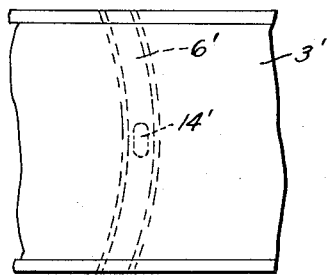
Fig. 4 is a plan view of the mechanism of Fig. 3, with parts for reasons of a clearer showing omitted.

The lifting mechanism of Figs. 3 and 4 includes a hydraulically operated lifting or elevating member. A hydraulic cylinder 10 is carried by an extension 4' of a frame of a tractor, the frame and tractor being not shown. Reciprocated in the cylinder is the lifting device or elevating member 5' which terminates in a forklike member 12. The latter together with a U-shaped rail 6' which is secured to the underside of a trailer 3' form a seat for a roller 14. The U-shaped rail is arcuated, as can be seen from Fig. 4, the arc being concentric with respect to the support for the trailer 3', the support being not shown either. Due to the use of such arcuate bearing means on the undersides of the trailer, it is possible to swing the trailer, with its wheels raised off the ground, about its support. There are actuating and locking means provided to carry out the swinging movement and to arrest the trailer from undesired movements. Instead of the roller 14, a ball or a series of balls may be provided.

It will be seen that with the arrangement here disclosed, the lift of the trailer may be varied. The stroke of the lifting device is preferably selected so as to permit the trailer to be raised until its rear wheels are free off the ground. The lifting device may be energized by any of the sources of power usually available on a tractor, such as compressed air, hydraulic fluid under pressure, electric devices. The necessary controls may be installed in the cab and/or at the lifting device itself. The lifting device may also be operated by hand, for example, by a rack and pinion arrangement, a crank, etc. It is also possible to use instead of a single lifting device a plurality of co-operating lifting devices, for instance, two lifting cylinders, the piston rods of which are joined by a common bridge.

It is believed that the construction and operation of the form of tractor and semitrailer combination for practicing the invention, as shown, and the many advantages thereof, will be understood from the foregoing detailed description thereof. Some of the features of the invention are reviewed hereinafter. The lifting device is mounted on the tractor behind the support for the semitrailer. I prefer to extend the frame of the tractor rearwardly beyond the support for the trailer and to provide the lifting device at the rear end of that extension. Depending on the leverage resulting from the distance between the lifting device and the drive wheels of the tractor, and depending on the extent to which the rear end of the trailer is raised, the load acting upon the driving wheels of the tractor can be varied.

It will be apparent that while I have shown and described my invention in a preferred form, many changes and modifications may be made without departing from the spirit of the invention defined in the following claims.

I claim:

1. In combination with a tractor having front and rear wheels and a semi-trailer having rear wheels; a support for the front end of the semi-trailer mounted on said tractor between the front and rear wheels of the latter, and a lifting device mounted on said tractor behind said support and adapted to act upwardly from below upon a portion of the semi-trailer, which is behind the rear wheels of the tractor.

2. The combination as in claim 1; wherein said tractor has a frame and extension of the latter extending rearwardly with respect to said rear wheels of the tractor, said lifting device being mounted on the rear end portion of said extension.

3. The combination as in claim 2; wherein said lifting device is operative to swing the semi-trailer about said support relative to said tractor to an extent sufficient to at least raise the rear wheels of the semi-trailer off the ground.

4. The combination as in claim 1; wherein said lifting device includes an hydraulically operated cylinder having a piston therein.

5. The combination as in claim 1; wherein said lifting device includes a pneumatically operated cylinder having a piston therein.

6. The combination as in claim 1; wherein said lifting device includes a vertically movable elevating member, and the semi-trailer has bearing means on the underside thereof adapted for engagement by said elevating member.

7. The combination as in claim 6; wherein said bearing means has an arcuate bearing surface engageable by said elevating member, the arc being concentric with respect to the support.

References Cited in the file of this patent

UNITED STATES PATENTS

| | | |
|---|---|---|
| 2,351,151 | Sattler | June 3, 1944 |
| 2,522,385 | Lindsay | Sept. 12, 1950 |
| 2,663,574 | Martin | Dec. 22, 1953 |
| 2,667,363 | Talbert | Jan. 26, 1954 |
| 2,708,044 | Sher | May 10, 1955 |